United States Patent
Kim et al.

(10) Patent No.: US 7,663,255 B2
(45) Date of Patent: Feb. 16, 2010

(54) COMPRESSED-AIR-STORING ELECTRICITY GENERATING SYSTEM AND ELECTRICITY GENERATING METHOD USING THE SAME

(75) Inventors: Yeong-min Kim, Daejeon (KR); Daniel Favrat, Lausanne (CH); Dong-gil Sin, Daejeon (KR); Kyu-baek Cho, Daejeon (KR)

(73) Assignee: Korea Institute of Machinery & Materials, Daejeon (KR)

( * ) Notice: Subject to any disclaimer, the term of this patent is extended or adjusted under 35 U.S.C. 154(b) by 0 days.

(21) Appl. No.: 12/377,866

(22) PCT Filed: Aug. 16, 2007

(86) PCT No.: PCT/KR2007/003911

§ 371 (c)(1), (2), (4) Date: Feb. 18, 2009

(87) PCT Pub. No.: WO2008/023901

PCT Pub. Date: Feb. 28, 2008

(65) Prior Publication Data

US 2009/0200805 A1 Aug. 13, 2009

(30) Foreign Application Priority Data

Aug. 21, 2006 (KR) ........................ 10-2006-0079034

(51) Int. Cl.
*F02B 63/04* (2006.01)
(52) U.S. Cl. .......................................... 290/1 R; 60/398
(58) Field of Classification Search ................. 290/1 R; 60/398

See application file for complete search history.

(56) References Cited

U.S. PATENT DOCUMENTS

| 4,753,078 A | * | 6/1988 | Gardner, Jr. | .................. 60/668 |
| 7,281,371 B1 | * | 10/2007 | Heidenreich | .................. 60/398 |

FOREIGN PATENT DOCUMENTS

| JP | 07-310561 A | 11/1995 |
| JP | 11-107779 A | 4/1999 |
| JP | 2895937 B2 | 5/1999 |
| KR | 10-2000-0014287 A | 3/2000 |

\* cited by examiner

*Primary Examiner*—T C Patel
*Assistant Examiner*—Iraj A Mohandesi
(74) *Attorney, Agent, or Firm*—Jae Y. Park; Kile Goekjian Reed & McManus

(57) ABSTRACT

Disclosed are a compressed air energy-storing electricity generating system and an electricity generating method using the same, in which air of a high pressure is injected into a tank laid under the ground using midnight electricity and surplus produced electricity, and the air of the high pressure in the tank is uniformly discharged so as to drive a generator during a time period when the consumption of electric power is high, thus efficiently managing energy.

9 Claims, 6 Drawing Sheets

COMPRESSED-AIR-STORING ELECTRICITY GENERATING SYSTEM AND ELECTRICITY GENERATING METHOD USING THE SAME

BACKGROUND OF THE INVENTION

1. Field of the Invention

The present invention relates to a compressed air energy-storing electricity generating system and an electricity generating method using the same, and more particularly to a compressed air energy-storing electricity generating system and an electricity generating method using the same, in which air of a high pressure is injected into a tank laid under the ground using midnight electricity and surplus produced electricity, and the air of the high pressure in the tank is uniformly discharged so as to drive a generator during a time period when the consumption of electric power is high, thus efficiently managing energy.

2. Description of the Related Art

Midnight electricity means electricity used late at night from 10 pm of one day to 8 am of the next day or from 11 pm of one day to 9 am of the next day when the consumption of electricity is low, and has an inexpensive electric charge due to the supply of surplus electric power. Thus, various methods for using midnight electricity have been proposed. Representative apparatuses for using midnight electricity include a regenerative boiler using midnight electricity and a regenerative water heater using midnight electricity. These apparatuses store midnight electricity by night and use the stored electricity by day so as to disperse the consumption of electricity power concentrated on the daytime.

Further, according to another method for using midnight electricity, compressed air is stored in an underground cave using midnight electricity and the stored compressed air is supplied to a turbine by day so as to drive a generator, thus reducing the consumption of electric power by day.

As shown in FIG. 4, in a conventional compressed air energy storage (CAES) system using midnight electricity, air compressed by a compressor 20, driven using midnight electricity, is injected into a storage tank 30, and the stored compressed air is discharged to the outside during a time period when the consumption of electric power is high. The discharged compressed air is mixed with a fuel in a burner 50 such that the mixture of the air and the fuel is burned, and a turbine 40 is driven by the pressure of the burnt gas. Thereby, a generator is driven.

Such a system compresses air using midnight electricity, and uses energy converted from the compressed air if necessary. However, as the compressed air is continuously discharged to the outside, the pressure in the storage tank 30 is gradually lowered and the pressure of the discharged compressed air is gradually lowered, and thus a turbine driving efficiency is depreciated. Accordingly, an apparatus, which can continuously discharge compressed air stored at a uniform pressure, has been strongly required.

SUMMARY OF THE INVENTION

Therefore, the present invention has been made in view of the above problems, and it is an object of the present invention to provide a compressed air energy-storing electricity generating system and an electricity generating method using the same, in which at least two storage tanks storing compressed air are provided with lower portions connected by a connection pipe and respectively have separate spaces for containing storage water. Thus, when air is compressed and stored using midnight electricity, in the case that the compressed air of a desired pressure is injected into one storage tank connected to a compressor, the increase of pressure in the storage tank is sensed and storage water is forcibly transferred to a hydraulic pump installed on the connection pipe so that the pressure in the storage tank is uniformly maintained, and simultaneously the other storage tank, hermetically sealed, serves as an accumulator for storing hydraulic energy due to the compression of sealed air.

Further, the compressed air in the storage tank connected to a turbine is discharged by day, and then the decrease of the pressure in the storage tank is sensed and the hydraulic pump on the connection pipe serves as a hydraulic motor and supplies the storage water into the storage tank storing the compressed air so that the pressure in the storage tank is uniformly maintained, and simultaneously electricity is generated using the hydraulic energy stored in the accumulator through the hydraulic motor.

Accordingly, there are provided a compressed air energy-storing electricity generating system and an electricity generating method using the same, in which the pressure in the storage tank for storing the compressed air is uniformly maintained due to the transfer of the storage water so as to maximize efficiencies of the compressor and the turbine when the compressed air is stored in the storage tank or the compressed air in the storage tank is discharged, and hydraulic energy is stored in the accumulator by night and electricity is generated using the stored hydraulic energy by day.

In accordance with one aspect of the present invention, the above and other objects can be accomplished by the provision of a compressed air energy-storing electricity generating system, which comprises a compressor sucking and compressing external air through driving of a motor, storage tanks storing the compressed air, a burner mixing the compressed air, supplied from the storage tanks, with a fuel and burning the obtained mixture, and a generator driving a turbine using the obtained burnt gas and generating electricity through driving of the turbine, wherein the storage tanks include a first storage tank and a second storage tank, separately disposed such that the lower portions of the two tanks are connected by a connection pipe, the first storage tank is provided with an inlet hole and an outlet hole formed through the upper portion thereof so as to receive the compressed air supplied from the compressor and discharge the compressed air from the first storage tank, and storage water is contained in the first and second storage tanks such that the second storage tank is hermetically sealed so as to serve as an accumulator.

A hydraulic pump/motor unit may be installed on the connection pipe connecting the first and second storage tanks, and forcibly transfer the storage water from the first storage tank to the second storage tank by means of a pump function or transfer the storage water from the second storage tank in a high pressure state to the first storage tank in a low pressure state due to pressure equilibrium.

A pressure sensor may be installed in the first storage tank, compare a sensed value with a set value, and operate the hydraulic pump/motor as a result of the comparison.

Sealed air stored in the second storage tank may have a pressure higher than that of the compressed air stored in the first storage tank in an atmospheric state by a designated degree such that the storage water fills 90% or more of the total volume of the first storage tank when the inside of the first storage tank is in the atmospheric state.

A second generator may be installed in the hydraulic pump/motor unit, and when a hydraulic motor function of the hydraulic pump/motor unit is performed, the motor may be driven by the transfer of the storage water stored in the second storage tank so as to generate electricity.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, a compressed air energy-storing electricity generating system in accordance with the present invention will be described in detail with reference to the annexed drawings.

Figure 1:
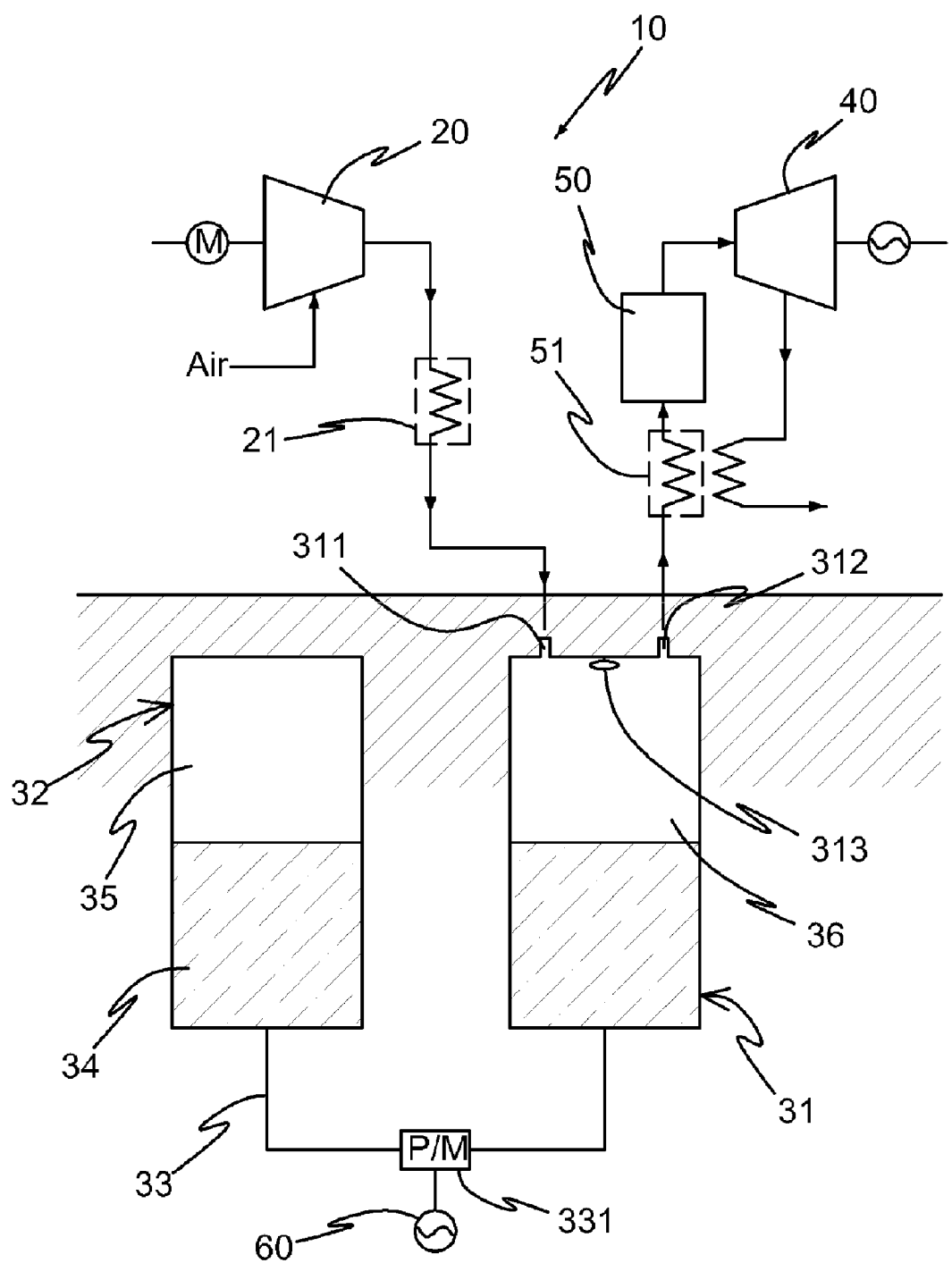
FIG. 1 is a schematic view illustrating a compressed air energy-storing electricity generating system in accordance with the present invention.
Figure 2:
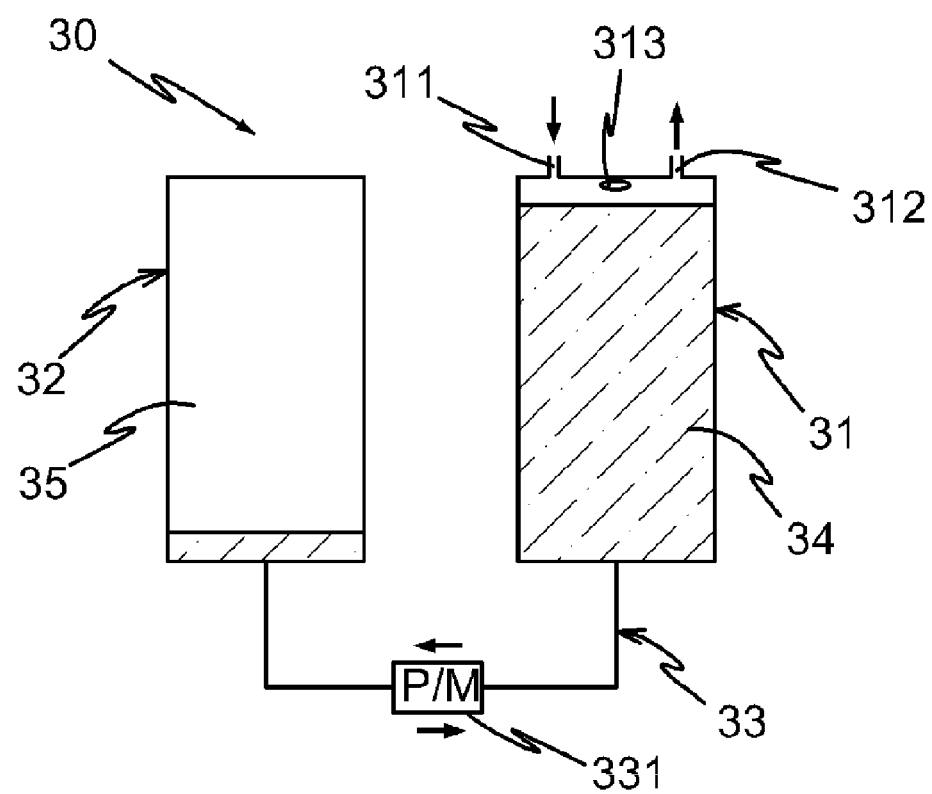
FIGS. 2 to 4 are views illustrating the change of pressure in storage tanks of the compressed air energy-storing electricity generating system in accordance with the present invention.
Figure 3:
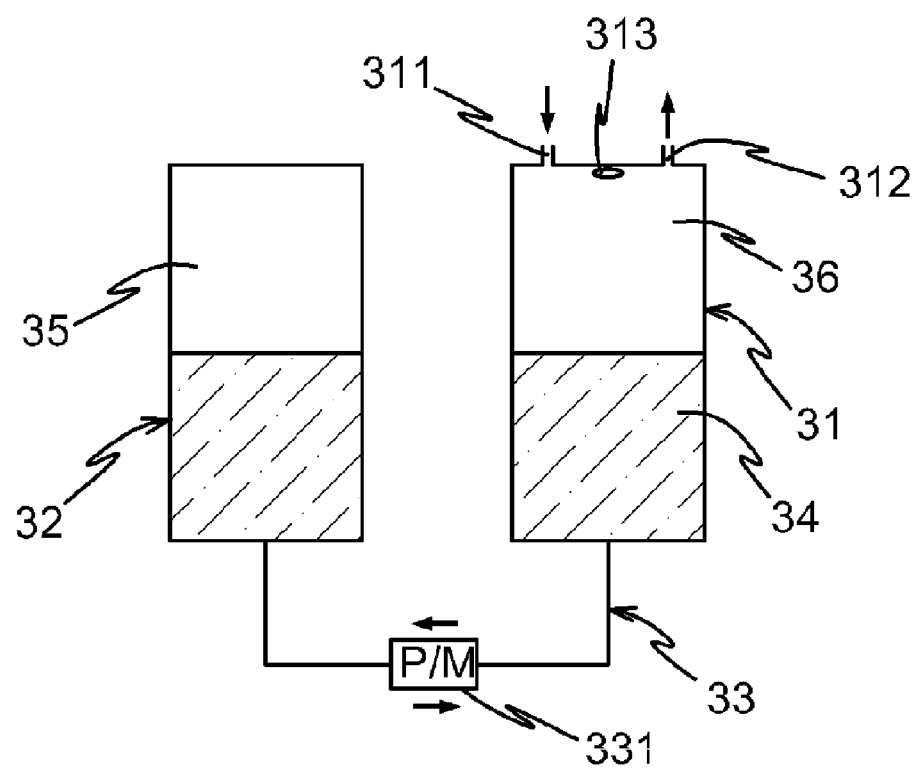
Figure 4:
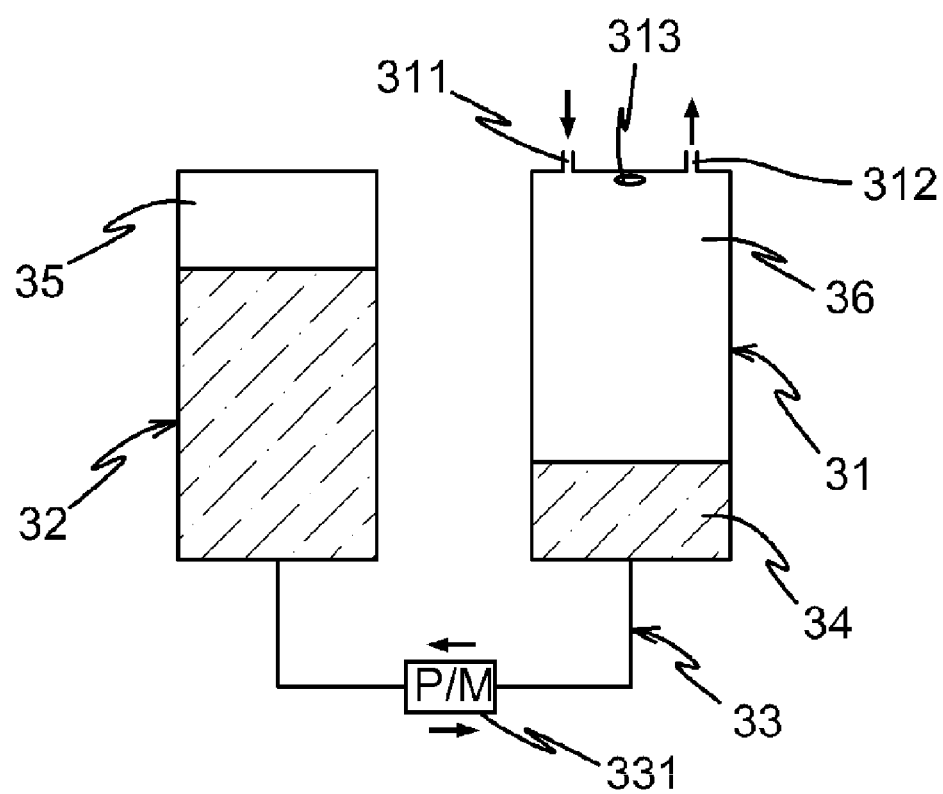
Figure 5:
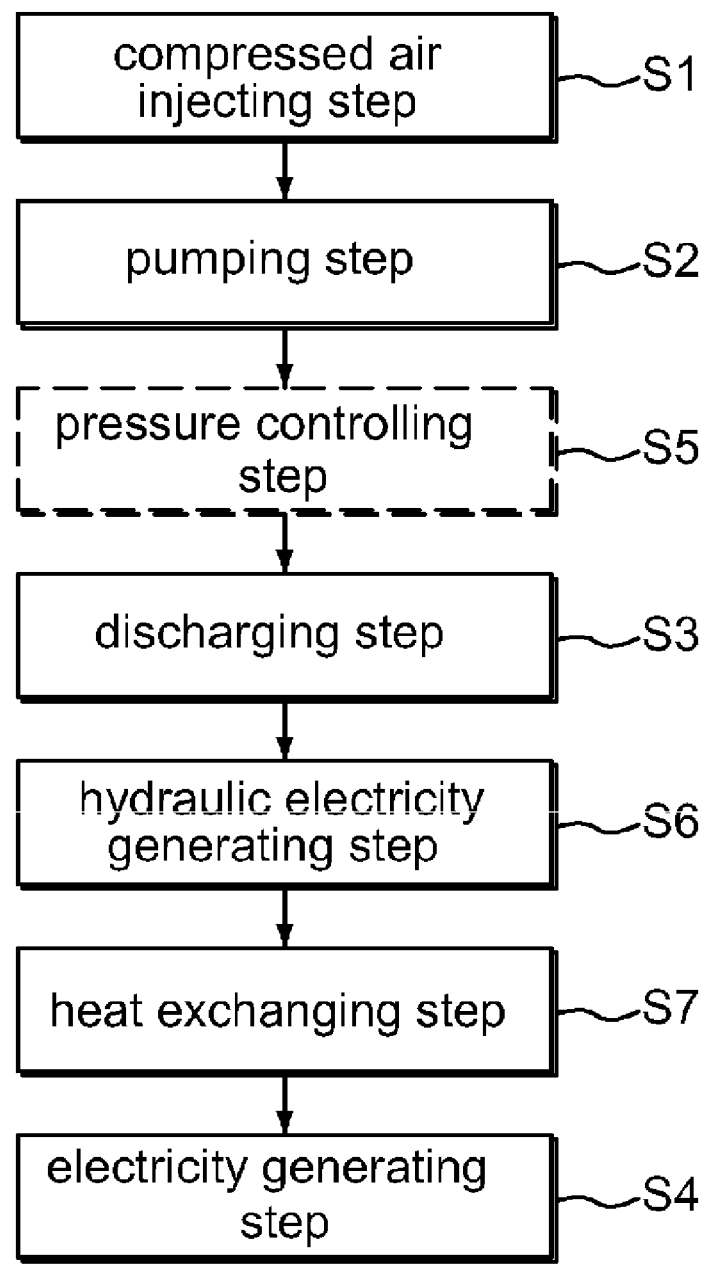
FIG. 5 is a block diagram illustrating an electricity generating method using the compressed air energy-storing electricity generating system in accordance with the present invention.
Figure 6:
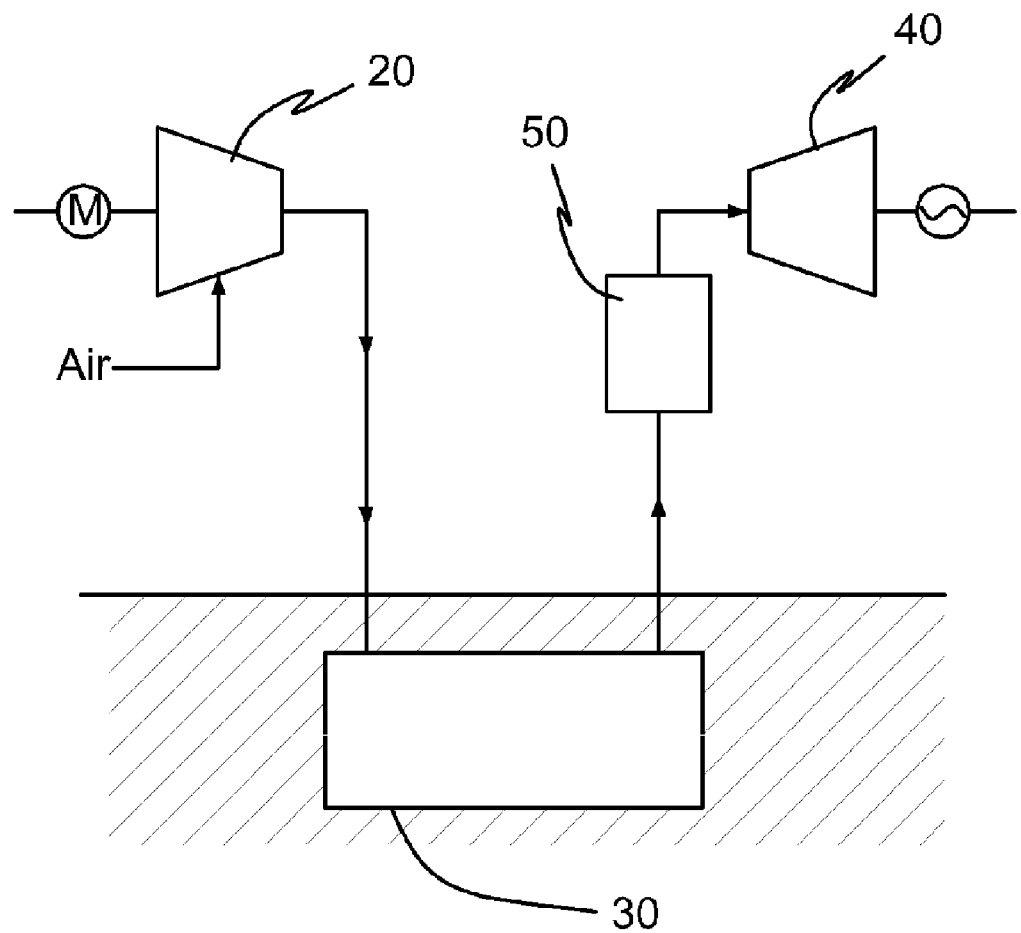
FIG. 6 is a schematic view illustrating a conventional compressed air energy-storing electricity generating system.

FIG. 1 is a schematic view illustrating a compressed air energy-storing electricity generating system in accordance with the present invention, FIGS. 2 to 4 are views illustrating the change of pressure in storage tanks of the compressed air energy-storing electricity generating system in accordance with the present invention, and FIG. 5 is a block diagram illustrating an electricity generating method using the compressed air energy-storing electricity generating system in accordance with the present invention.

As shown in FIG. 1, a compressed air energy-storing electricity generating system 10 of the present invention includes a compressor 20, storage tanks 30, which store air compressed by the compressor 20, and a turbine 40, which is driven by the compressed air discharged from the storage tanks 30.

The compressor 20 drives a motor using midnight electricity or surplus produced electricity, receives external air due to the driving of the motor, and compresses the external air. Here, one compressor may be installed or a plurality of compressors may be installed in parallel so as to shorten an air compressing time.

The storage tanks 30 are installed at the outside or buried under the ground. When the compressed air energy-storing electricity generating system 10 is installed in a city, on which many buildings are concentrated, it is preferable that the storage tanks 30 are buried under the ground and thus a ground space is utilized.

In the present invention, the two storage tanks 30 are used. However, if necessary, in order to increase the total storage capacity, the number of the storage tanks 30 is increased to three or more, or the volumes of the storage tanks 30 are increased.

As shown in FIGS. 1 to 5, the storage tanks 30 include a first storage tank 31 and a second storage tank 32. The first storage tank 31 is provided with an inlet hole 311, through which the air compressed by the compressor 20 is injected into the first storage tank 31, and an outlet hole 312, through which the compressed air in the first storage tank 31 is discharged to the outside. The lower portions of the first and second storage tanks 31 and 32 are connected by a connection pipe 33. A designated amount of storage water 34 is contained in the lower portions of the first and second storage tanks 31 and 32 such that the storage water 34 flows between the first and second storage tanks 31 and 32. That is, sealed air 35 is located in the upper portion of the second storage tank 32, hermetically sealed, and the storage water 34 is located in the lower portion of the second storage tank 32, and when the storage water 34 flows from the first storage tank 31 to the second storage tank 32 through the connection pipe 33, the sealed air 35 has a reduced volume and a high pressure and thus the second storage tank 32 serves as an accumulator.

A hydraulic pump/motor unit 331, which serves as both a hydraulic pump and a hydraulic motor, is installed on the connection pipe 33 passing the storage water 34. For example, the hydraulic pump/motor unit 331 is operated as the hydraulic motor using midnight electricity by night so as to move the maximum amount of the storage water 34 to the second storage tank 32, and the connection pipe 33 is opened by day when the consumption of electric power is high so as to move the storage water 34 in the second storage tank 32 to the first storage tank 31 due to the expansion of sealed air 35 in a high pressure state and to continuously discharge compressed air 36 stored in the first storage tank 31 to the outside. Of course, the hydraulic pump and the compressor 20 may use surplus produced electricity during a time period by day when the consumption of electric power is low.

The compressed air 36 discharged through the outlet hole 312 of the first storage tank 31 is mixed with the fuel in the burner 50, and the mixture is burned and thus drives the turbine 40. Then, a generator connected to a turbine shaft generates electricity due to the driving of the turbine 40.

Further, a cooler 21 and a regenerator 51 are respectively installed in routes of the compressed air 36 supplied to and discharged from the storage tanks 30. Since the compressed air 36 supplied to the storage tanks 30 has a high temperature, the compressed air 36 passes through the cooler 21 so that the compressed air 36 is stored after the volume of the compressed air 36 is reduced, and thus the storage capacity of the compressed air 36 in the storage tanks 30 is increased. Further, the compressed air 36 discharged from the storage tanks 30 passes through the regenerator 51 so that the compressed air 36 exchanges heat with gas of a high temperature exhausted from the turbine 40, and thus the burning due to the mixing of the compressed air 36 and the fuel is easily achieved and a turbine driving efficiency due to the expansion of the volume of the compressed air 36 is increased.

A pressure sensor 313 is installed in the first storage tank 31. The pressure sensor 313 senses the pressure in the first storage tank 31, compares the sensed pressure with a set value, and operates the hydraulic pump of the hydraulic pump/motor unit 331 as a result of the comparison. That is, when the compressor 20 stores the compressed air 36 of a desired pressure in the first storage tank 31 using midnight electricity, the pressure sensor 313 senses the increase of the pressure in the first storage tank 31 and operates the hydraulic pump such that the storage water 34 in the first storage tank 31 is forcibly transferred to the second storage tank 32, thus uniformly maintaining the pressure in the first storage tank 31. On the contrary, when the compressed air 36 in the first storage tank 31 is supplied to the turbine 40 by day, the pressure sensor 313 senses the decrease of the pressure in the first storage tank 31 and opens the hydraulic pump/motor unit 331 such that the storage water 34 in the second storage tank 32 is transferred to the first storage tank 31, thus uniformly maintaining the pressure in the first storage tank 31. Although this embodiment describes the hydraulic pump/motor unit 331 including both the hydraulic pump and the hydraulic motor, the hydraulic pump and the hydraulic motor may be separately installed. Accordingly, this system further includes control units for respectively controlling the hydraulic pump and the hydraulic motor such that the hydraulic pump and the hydraulic motor can be smoothly operated.

A second generator is installed on a hydraulic motor shaft of the hydraulic pump/motor unit 331. The storage water 34 in the second storage tank 32 is transferred to the first storage tank 31 due to the increase of the pressure of the sealed air 35, and drives the hydraulic motor having a hydraulic turbine function, thus operating the second generator. That is, the hydraulic pump/motor unit 331 stores hydraulic pressure energy in the second storage tank 32 using midnight electricity. Further, during a time period by day when the consumption of electric power is high, the storage water 34 in the second storage tank 32 is transferred to the first storage tank 31, drives the hydraulic motor, and operates the second generator installed on the hydraulic motor shaft, and the storage water 34 transferred to the first storage tank 31 allows the compressed air 36 in the first storage tank 31 to be discharged at a regular pressure so as to drive the turbine 40. Thereby, the compressed air energy-storing electricity generating system 10 system 10 of the present invention generates electricity using hydraulic energy and compressed air.

Hereinafter, the change of the pressure in the storage tanks 30 of the above compressed air energy-storing electricity generating system 10 will be described in detail. Here, pressure of compressed air required to drive the turbine 40 is about 50 bar.

FIG. 2 illustrates the fundamental setting of the compressed air energy-storing electricity generating system 10 before the system 10 is driven. The storage water 34 is contained in the first storage tank 31 provided with the inlet hole 311 and the outlet hole 312, the sealed air 35 is contained in the hermetically sealed second storage tank 32, and the two tanks 31 and 32 are connected by the connection pipe 33. The hydraulic pump/motor unit 331 is installed on the connection pipe 33.

Here, the pressure of the storage water 34 contained in the first storage tank 31 is 50 bar, and the pressure of the sealed air 35 in the second storage tank 32 is 51 bar. In the case that the pressure of the sealed air 35 in the second storage tank 32 is larger than that of the storage water 34 contained in the first storage tank 31 by a designated amount, as described above, the storage water 34 is collected in the first storage tank 31 due to the pressure of the sealed air 35 in the second storage tank 20 in a stand-by state.

With reference to FIG. 3, the compressor 20 is driven using midnight electricity under the state of FIG. 2, and thus the compressed air 36 of a pressure of 50 bar is injected into the first storage tank 31. When the compressed air 36 having an amount, which is more than the capacity of the first storage tank 31, is injected into the first storage tank 31, the pressure in the first storage tank 31 is increased, and the pressure sensor 313 in the first storage tank 31 senses the increase of the pressure and thus operates the hydraulic pump/motor unit 331.

When the hydraulic pump of the hydraulic pump/motor unit 331 is operated using midnight electricity, the storage water 34 contained in the first storage tank 31 is forcibly transferred to the second storage tank 32, and thus the pressure in the first storage tank 31 is decreased to 50 bar. Further, the pressures of the sealed air 35 and the storage water 34 in the second storage tank 32 are gradually increased, and respectively reach 100 bar when the storage water 34 in the second storage tank 32 has the same water level as that of the storage water 34 in the first storage tank 31.

With reference to FIG. 4, when the hydraulic pump of the hydraulic pump/motor unit 331 is continuously operated, the storage water 34 in the first storage tank 31 is continuously transferred to the second storage tank 32 such that 75% of the storage water 34 is contained in the second storage tank 32. Then, the sealed air 35 in the second storage tank 32 has a reduced volume and a pressure of 200 bar. Further, the compressor 20 is continuously driven, and thus the compressed air 36 is continuously injected into the first storage tank 31 such that the compressed air 36 of a pressure of 50 bar fills 75% of the total volume of the first storage tank 31.

On the contrary, during a time period by day when the consumption of electric power is high, the connection pipe 33 is opened. Thus, the storage water 34 in the second storage tank 32 drives the hydraulic motor of the hydraulic pump/motor unit 331 and is transferred to the first storage tank 31 due to pressure equilibrium caused by a difference of pressures, and the compressed air 36 stored in the first storage tank 31, as much as the volume of the transferred storage water 34, is discharged through the outlet hole 312.

In more detail, when the hydraulic pump/motor unit 331 is opened under the state of FIG. 4, the sealed air 35 of a high pressure in the second storage tank 32 is expanded, and thus the storage water 34 in the second storage tank 32 is transferred to the first storage tank 31. According to the transfer of the storage water 34, the compressed air 36 of a pressure of 50 bar contained in the first storage tank 31 is discharged through the outlet hole 312.

That is, the storage water 34 in the second storage tank 32 is continuously transferred to the first storage tank 31 until the pressure of the sealed air 35 in the second storage tank 32 is almost equal to the pressure of the compressed air 36 in the first storage tank 31, and the compressed air 36 stored in the first storage tank 31 is continuously discharged due to the transfer of the storage water 34.

Now, with reference to FIG. 5, an electricity generating method using the above compressed air energy-storing electricity generating system of the present invention will be described, as follows.

The electricity generating method using the above compressed air energy-storing electricity generating system, which has the compressor 20, the first and second storage tanks 31 and 32, the lower portions of which are connected by the connection pipe 33, the hydraulic pump/motor unit 331 installed on the connection pipe 33 for transferring the storage water 34 between the first and second storage tanks 31 and 32, and the turbine 40 driven by the compressed air 36 discharged from the first storage tank 31 so as to generate electricity, includes a compressed air injecting step (S1), a pumping step (S2), a discharging step (S3), and an electricity generating step (S4).

In the compressed air injecting step (S1), the compressor 20 is driven using midnight electricity and surplus produced electricity, and thus the compressed air 36 is injected into the first storage tank 31.

Thereafter, in the pumping step (S2), the storage water 34 contained in the first storage tank 31 is forcibly transferred to the second storage tank 32 due to the pump function of the hydraulic pump/motor unit 331, and thus presses the sealed air 35 in the second storage tank 32 and leaves a space in the first storage tank 31, thereby increasing the inflow amount of the compressed air 36 using the compressor 20.

In the discharging step (S3), the compressed air 36 stored in the first storage tank 31 is discharged so as to drive the turbine 40, and the hydraulic pump/motor unit 331 installed on the connection pipe 33 is opened and thus the storage water 34, as much as the amount of the discharged compressed air 36, is transferred to the first storage tank 31 due to the increase of the pressure of the sealed air 35 in the second storage tank 32.

Further, in order to uniformly set the pressure of the compressed air 36 stored in the first storage tank 31 and the pressure of the compressed air 36 discharged from the first storage tank 31, a pressure controlling step (S5) may be achieved simultaneously with the pumping step (S2) and the discharging step (S3). That is, when the compressor 20 injects the compressed air 36 into the first storage tank 31, in the case that the compressed air 36 injected into the first storage tank 31 has a designated amount or more, the pressure of the compressed air 36 in the first storage tank 31 is increased. Then, a value, obtained by sensing the pressure of the compressed air 36 in the first storage tank 31 using the pressure sensor 313 installed in the first storage tank 31, is compared with a set value inputted by a user, and when the sensed value is more than the set value, the hydraulic pump of the hydraulic pump/motor unit 331 is driven and thus the storage water 34 is forcibly pumped into the second storage tank 32.

When the compressed air 36 is used during a time period when the consumption of electric power is high, the compressed air 36 is discharged from the first storage tank 31 and thus the pressure of in the first storage tank 31 is lowered. Accordingly, when the sensed pressure is not more than the set value, the pressure sensor 313 opens the hydraulic pump/motor unit 331 so as to transfer the storage water 34 in the second storage tank 32 to the first storage tank 31 due to pressure equilibrium, thus uniformly maintaining the pressure of the compressed air 36 in the first storage tank 31.

Thereafter, a hydraulic electricity generating step (S6) is further performed. In the hydraulic electricity generating step (S6), when the storage water 34 is transferred from the second storage tank 32, serving as an accumulator, to the first storage tank 31, the storage water 34 drives the hydraulic motor of the hydraulic pump/motor unit 331 installed on the connection pipe 33, and the second generator 60 generates electricity due to the driving of the hydraulic motor.

Thereafter, in the electricity generating step (S4), the compressed air 36 discharged in the discharging step (S3) is mixed with the fuel in the burner 50, and the mixture is burned. Then, the obtained burnt gas enters the turbine 40 and collides with turbine blades, thereby driving the turbine 40 so as to generate electricity.

Further, a heat exchanging step (S7) may be performed. In this case, after the heat exchanging step (S7) is completed, electricity is generated using the compressed air 36 discharged in the discharging step (S3). That is, the discharged compressed air 36 passes through the regenerator 51 so that the compressed air 36 exchanges heat with gas of a high temperature exhausted from the turbine 40, and the compressed air 36 in a high temperature state is put into the burner 50. Here, the volume of the compressed air, to which the heat is applied, is gradually increased, and is then rapidly increased simultaneously with burning, and thus the output of the turbine 40 is improved.

As apparent from the above description, the present invention provides a compressed air energy-storing electricity generating system and an electricity generating method using the same, in which at least two storage tanks storing compressed air are provided with lower portions connected by a connection pipe and respectively have separate spaces for containing storage water, and thus a hydraulic pump/motor unit installed on the connection pipe serves as a hydraulic pump and forcibly transfers the storage water so that the air in one storage tank, hermetically sealed, has a high pressure and compressed air of a desired pressure is injected into the other storage tank.

Thus, when the hydraulic pump/motor unit installed on the connection pipe is opened, the sealed air in the sealed storage tank is expanded due to pressure equilibrium and the storage water in the sealed storage tank passes through the hydraulic pump/motor unit serving as a hydraulic motor and is transferred to the other storage tank containing the compressed air, and the compressed air in the other storage tank is discharged to the outside as much as the volume of the transferred storage water.

As described above, there are provided the present invention provides an environmentally friendly compressed air energy-storing electricity generating system and an electricity generating method using the same, in which the storage water is transferred between the two storage tanks according to the compressed state of the air within the storage tanks and thus the pressure and the amount of the compressed air, finally discharged, are uniformly maintained so as to maximize efficiencies of a compressor and a turbine, and hydraulic energy is stored in the sealed storage tank, serving as an accumulator, by night and electricity is generated using the stored hydraulic energy by day.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A compressed air energy-storing electricity generating system, which comprises a compressor sucking and compressing external air through driving of a motor, storage tanks storing the compressed air, a burner mixing the compressed air, supplied from the storage tanks, with a fuel and burning the obtained mixture, and a generator driving a turbine using the obtained burnt gas and generating electricity through driving of the turbine,
    wherein the storage tanks include a first storage tank and a second storage tank, separately disposed such that the lower portions of the two tanks are connected by a connection pipe, the first storage tank is provided with an inlet hole and an outlet hole formed through the upper portion thereof so as to receive the compressed air supplied from the compressor and discharge the compressed air from the first storage tank, and storage water is contained in the first and second storage tanks such that the second storage tank is hermetically sealed so as to serve as an accumulator.

2. The compressed air energy-storing electricity generating system according to claim 1, wherein a hydraulic pump/motor unit is installed on the connection pipe connecting the first and second storage tanks, and forcibly transfers the storage water from the first storage tank to the second storage tank by means of a pump function or transfers the storage water from the second storage tank in a high pressure state to the first storage tank in a low pressure state due to pressure equilibrium.

3. The compressed air energy-storing electricity generating system according to claim 2, wherein a pressure sensor is installed in the first storage tank, compares a sensed value with a set value, and operates the hydraulic pump/motor as a result of the comparison.

4. The compressed air energy-storing electricity generating system according to claim 1, wherein sealed air stored in the second storage tank has a pressure higher than that of the compressed air stored in the first storage tank in an atmospheric state by a designated degree such that the storage water fills 90% or more of the total volume of the first storage tank when the inside of the first storage tank is in the atmospheric state.

5. The compressed air energy-storing electricity generating system according to claim 2, wherein a second generator is installed in the hydraulic pump/motor unit, and when a hydraulic motor function of the hydraulic pump/motor unit is performed, the motor is driven by the transfer of the storage water stored in the second storage tank so as to generate electricity.

6. An electricity generating method using a compressed air energy-storing electricity generating system, which has a compressor, first and second storage tanks, the lower portions of which are connected by a connection pipe, a hydraulic pump/motor unit installed on the connection pipe for transferring storage water between the first and second storage tanks, and a turbine driven by compressed air discharged from the first storage tank so as to generate electricity, comprising:

injecting the compressed air into the first storage tank using the compressor;

forcibly pumping the storage water in the first storage tank into the second storage tank by driving the hydraulic pump/motor unit installed on the connection pipe using midnight electricity so as to press sealed air in the second storage tank;

discharging the compressed air stored in the first storage tank, and transferring the storage water in the second storage tank to the first storage tank as much as the volume of the discharged compressed air by means of pressure equilibrium by opening the hydraulic pump/motor unit installed on the connection pipe; and generating electricity by driving the turbine by mixing the discharged compressed air with a fuel in a burner and burning the mixture.

7. The electricity generating method according to claim 6, further comprising comparing a value sensed by a pressure sensor installed in the first storage tank with a set value inputted by a user, and pumping the storage water in the first storage tank to the second storage tank by performing a pump function of the hydraulic pump/motor unit when the sensed value is more than the set value, and transferring the storage water in the second storage tank to the first storage tank due to a difference of pressures by opening the hydraulic pump/motor unit when the sensed value is less than the set value, in the pumping of the storage water and the discharging of the compressed air.

8. The electricity generating method according to claim 6, further comprising allowing a second generator to generate electricity by driving a hydraulic motor of the hydraulic pump/motor unit when the storage water in the second storage tank is transferred to the first storage tank due to hydraulic energy, in the discharging of the compressed air.

9. The electricity generating method according to claim 6, further comprising exchanging heat between the discharged compressed air and gas of a high temperature exhausted from the turbine, while the compressed air passes through a regenerator, and putting the compressed air in a high temperature state into the burner.

* * * * *